United States Patent [19]

Pierce et al.

[11] Patent Number: 5,642,896

[45] Date of Patent: Jul. 1, 1997

[54] LOCKING PINS FOR MOVABLE SUBFRAME OF TRACTOR-TRAILERS

[75] Inventors: Phillippi Randsome Pierce; Scott Allen Dilling; John Edward Ramsey, all of Canton, Ohio

[73] Assignee: The Boler Company, Itasca, Ill.

[21] Appl. No.: 705,787

[22] Filed: Aug. 30, 1996

[51] Int. Cl.⁶ .................................................. B62D 53/06
[52] U.S. Cl. .................................. 280/149.2; 280/407.1; 180/209
[58] Field of Search ............................ 280/149.2, 407.1, 280/405.1; 180/209

[56] References Cited

U.S. PATENT DOCUMENTS

| | | | |
|---|---|---|---|
| 3,146,000 | 8/1964 | Holzman | 280/407.1 X |
| 3,198,548 | 8/1965 | Land | 280/407.1 X |
| 4,531,753 | 7/1985 | Hicks | 280/149.2 |
| 4,838,566 | 6/1989 | Baxter et al. | 280/149.2 |
| 4,944,522 | 7/1990 | Hart | 280/149.2 |
| 5,137,296 | 8/1992 | Forman | 280/407.1 |
| 5,564,727 | 10/1996 | Wessels | 280/407.1 |

FOREIGN PATENT DOCUMENTS

| | | | |
|---|---|---|---|
| 0409923 | 2/1971 | Australia | 280/149.2 |

Primary Examiner—Christopher P. Ellis

[57] ABSTRACT

A movable subframe for tractor-trailers, commonly referred to as a slider, includes a retractable pin mechanism having improved locking pins for locking the movable subframe in a selected position relative to the tractor-trailer body. The improved pin includes a tapered or truncated conical-shaped portion which nests in a tapered enclosure when the pins are in the fully extended or locked position. When one or more of the pins of the retractable pin mechanism become jammed in the locked position due to slight misalignment between the respective slider and trailer body openings through which each pin extends when in the locked position, a generally uniformly distributed contact surface pressure exists between the truncated conical-shaped portion of the pin and the tapered enclosure. Other parts of the pin are subjected to relatively intense contact point pressures. Such pressures in turn cause shear forces which resist retraction of the jammed pins. However, a vehicle operator attempting to free the pins need only to slightly retract the pin mechanism and clearance is created between the tapered portion of each jammed pin and the tapered enclosure, much like pulling two tapered cups apart when one is stored within the other. Once clearance occurs, the areas of contact point pressure on the pin at other locations also are relieved. The retraction of the jammed pins of the present invention is achieved without overexertion on the part of the vehicle operator and/or damage to the retractable pin mechanism.

8 Claims, 6 Drawing Sheets

LOCKING PINS FOR MOVABLE SUBFRAME OF TRACTOR-TRAILERS

BACKGROUND OF THE INVENTION

1. Technical Field

The invention relates to tractor-trailer subframes, and in particular to movable subframes for tractor-trailers. More particularly, the invention is directed to a movable subframe for tractor-trailers which includes a retractable pin mechanism for locking the movable subframe in a selected position relative to the tractor-trailer body, wherein the pins each have a generally tapered or truncated conical-shaped portion for facilitating the retraction of jammed pins from the locked to an unlocked position.

2. Background Art

Movable subframes, typically referred to as sliders, have been utilized on tractor-trailers or semi-trailers for many years. One or more axle/suspension systems usually are suspended from a single slider structure. The slider is in turn mounted on the underside of the trailer body, and is movable longitudinally therealong to provide a means of variable load distribution. More specifically, the amount of cargo that a trailer may carry is governed by local, state and/or national road and bridge laws, and is dependent on proper load distribution. The basic principle behind most road and bridge laws is to limit the maximum load that a vehicle may carry, as well as to limit the maximum load that can be supported by individual axles. A trailer having a slider gains an advantage with respect to laws governing maximum axle loads. More particularly, proper placement of the slider varies individual axle loads or redistributes the trailer load so that it is within legal limits.

Once properly positioned, the slider is locked in place on the underside of the trailer by a retractable pin mechanism. The retractable pin mechanism generally includes two or more, and typically four, retractable pins which may be interconnected by a usually manually operated crank mechanism. When the pins are in their extended or outboardmost position, they each extend through a respective opening formed in the slider and a selected aligned one of a plurality of openings formed in the trailer body. The pins thereby lock the slider in a selected position relative to the trailer body.

However, these pins can become jammed. The mechanical advantage enjoyed by the manual operator of the pin mechanism is designed to overcome spring forces which bias the pins in the locked position, for retracting the pins when it becomes necessary to reposition the slider. The mechanical advantage is not designed to free or retract jammed pins from their locked position. Since the mechanical advantage is sometimes inadequate, prior art slider pin mechanisms rely on either the brute force of the tractor-trailer operator or add-on devices designed to release jammed pins.

In assessing the reason for jammed pins, applicants have discovered that shear forces are imposed on the individual pins. The shear forces operate in the direction of the longitudinal axis of each cylindrical pin. More specifically, slight movement of the slider relative to the trailer body during operation of the tractor-trailer can cause slight misalignment between the respective slider and trailer body openings through which each pin extends when in the locked position. This misalignment can in turn cause contact pressure points between each pin and its respective trailer body opening, aligned slider opening, and mounting bracket opening adjacent to the inboard end of the pin. The contact pressure points in turn cause the above-mentioned shear forces on the pins. Such whipsaw-like or jamming forces can become greater than the force that a tractor-trailer operator can manually apply through the crank mechanism to free the pins.

Thus, when prior art pins become jammed, the operator of the tractor-trailer risks personal injury due to overexertion in attempting to manually free jammed pins, and further risks damaging the retractable pin mechanism. Specifically, a typical method of attempting to release prior art jammed pins is for the tractor-trailer operator to rock the trailer fore and aft, while an assistant operates the retractable pin mechanism. The rocking motion briefly realigns the misaligned openings, so that the assistant can retract the pins during the period of realignment. The process has been simplified by a prior art quick-release device which allows the vehicle operator to maneuver the trailer while the quick release device automatically frees the jammed pins, thus effectively obviating the need for another person to operate the crank mechanism. However, such an exercise can be time-consuming and also can create wear on the retractable pin mechanism.

The present invention solves the problem of requiring excessive force and/or additional equipment to free jammed pins by enabling the pins to free themselves. This is accomplished through the improved design of the present invention which includes a tapered or truncated conical-shaped portion which nests in a tapered enclosure when the pin is in the fully extended or locked position. Specifically, the tapered design replaces the contact point pressure which occurs in prior art pin designs at the misaligned slider opening, with a uniformly distributed contact surface pressure between the tapered portion of the pin and the tapered enclosure. Thus, when the vehicle operator attempts to manually free the jammed pin, clearance is created between the pin and enclosure due to their tapered configuration, and with very little retraction motion required by the vehicle operator on the crank mechanism. The action is similar to pulling two tapered cups apart when one is stored inside the other. Once clearance occurs at the tapered enclosure, the contact point pressures also are relieved at the trailer body opening and at the bracket opening adjacent the inboard end of the pin.

SUMMARY OF THE INVENTION

Objectives of the present invention include providing a locking pin for sliders of tractor-trailers which can be easily freed from a jammed and locked position by a single operator with limited force and physical exertion, and without damaging the retractable pin mechanism.

Another objective of the present invention is to provide such an improved locking pin for sliders without substantial additional equipment or cost.

These objectives and advantages are obtained by the locking pins for a movable subframe of a tractor-trailer of the present invention, the general nature of which may be stated as including a retractable locking pin mechanism of a subframe structure for a vehicle trailer, the subframe structure being movably mounted on spaced-apart, parallel elongated rails mounted on the bottom of the trailer, the trailer rails each being formed with a plurality of openings, the subframe structure including a pair of spaced-apart, parallel elongated main members, the main members each including means for movably engaging a respective one of the trailer rails, the main members each further being formed with at least one locking pin opening, the main member opening being selectively alignable with its respective trailer rail openings, for passage of a generally complementary-sized and shaped locking pin through the respective aligned openings for locking the subframe structure in a selected position relative to the vehicle trailer, the retractable locking pin mechanism including means for extending the pins to a locked position and a retraction mechanism for retracting the pins to an unlocked position, wherein the improvement comprises a locking pin including a generally cylindrical-shaped first end for extending through its respective aligned main member and trailer rail openings when the pin is in the extended locked position, for selectively positioning the subframe structure relative to the vehicle trailer; a second end attached to the retraction mechanism; a tapered midsection disposed between the first and second ends; and a receptacle mounted on the subframe structure, the receptacle formed with a tapered opening which is aligned with the respective main member opening, so that upon movement of the pin to an extended locked position, the tapered midsection nests firmly in the tapered receptacle opening, whereby the locking pin is generally easily retracted by the retraction mechanism when the pin becomes jammed due to misalignment of the subframe main member and trailer rail openings.

BRIEF DESCRIPTION OF THE DRAWINGS

The preferred embodiment of the invention, illustrative of the best mode in which applicants have contemplated applying the principles, is set forth in the following description and is shown in the drawings and is particularly and distinctly pointed out and set forth in the appended claims.

Similar numerals refer to similar parts throughout the drawings.

DESCRIPTION OF THE PREFERRED EMBODIMENT

Figure 1:
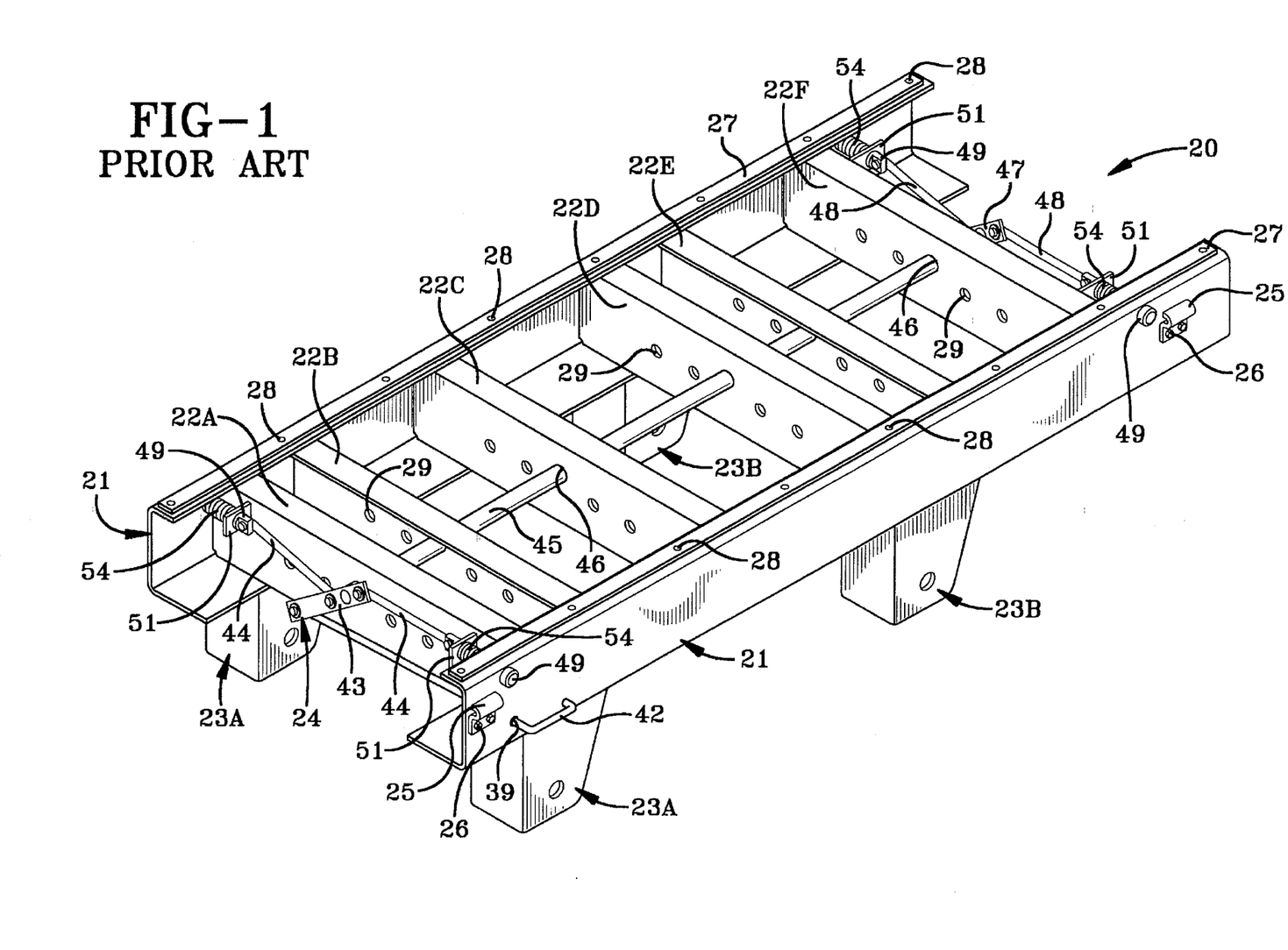
FIG. 1 is a perspective view of a slider for a tractor-trailer, showing a retractable pin mechanism having prior art locking pins used to selectively locate and lock the slider along the underside of a trailer, and further showing depending hangers for suspending axle/suspension systems.

A slider for a tractor-trailer having a retractable pin mechanism including prior art locking pins is indicated generally at 20 and is shown in FIG. 1. Slider 20 includes a pair of main members 21, a plurality of cross members 22A through F, front and rear pairs of hangers 23A and 23B, respectively, for suspending axle/suspension systems, and retractable pin mechanism 24.

Figure 2:
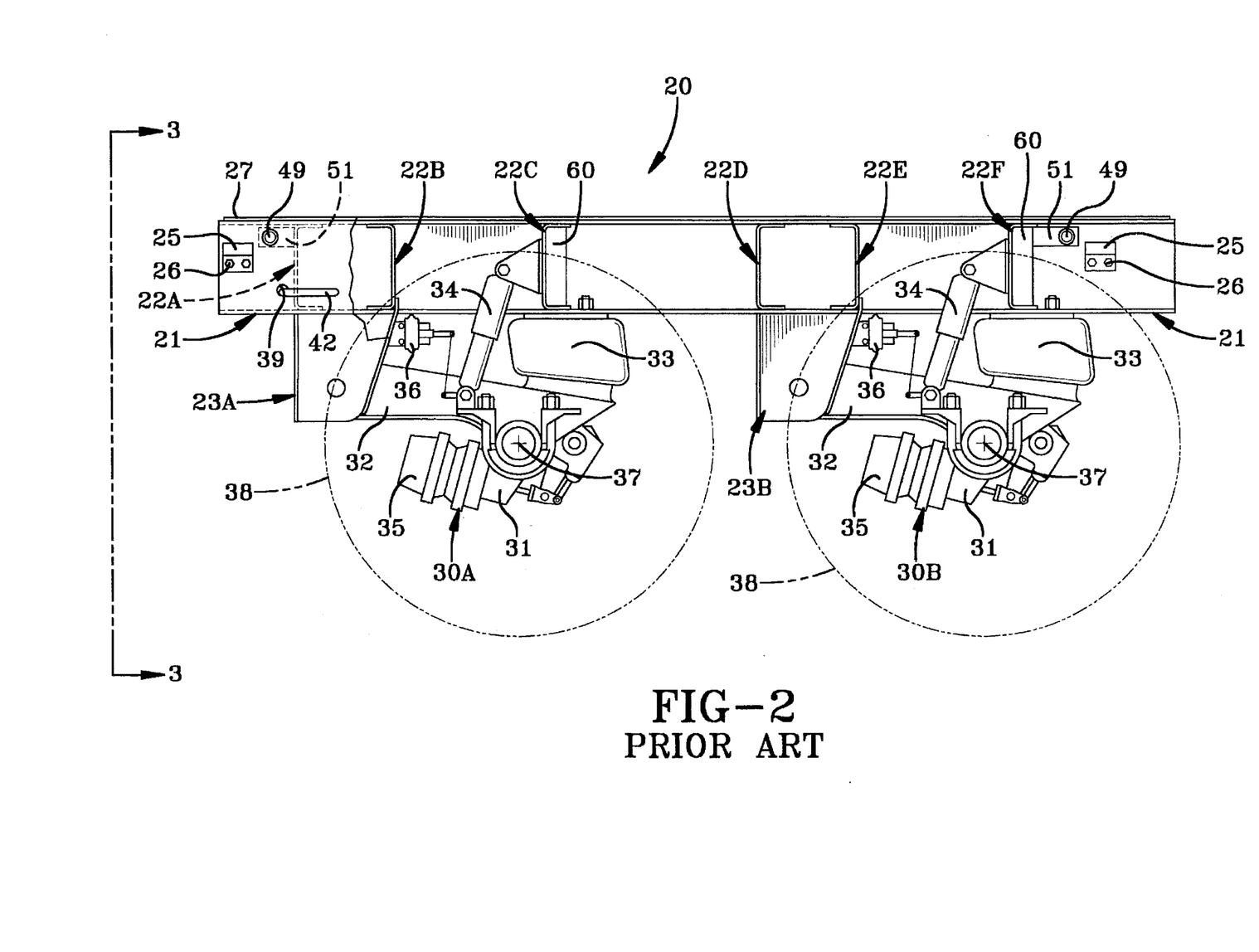
FIG. 2 is a fragmentary elevational view of the slider shown in FIG. 1, but showing the axle/suspension systems, with the location of wheels and hidden parts represented by broken lines.

Specifically, and as further shown in FIG. 2, each main member 21 is an elongated, generally C-shaped beam made of a metal such as steel or other suitable material. The open portion of each main member 21 is opposed to the open portion of the other main member and faces inboard relative to slider 20. Main members 21 are connected to each other in spaced apart parallel relationship by cross members 22A–F, which extend between and are perpendicular to main members 21. Each end of each cross member 22 nests in the open portion of a respective one of main members 21, and is secured therein by any suitable means such as welding or mechanical fastening. Each cross member 22 is a generally C-shaped beam made of a metal such as steel or other suitable material, and has a plurality of openings 29 formed in its vertically extending surface. Openings 29 are aligned with corresponding openings formed in the other cross members 22 to provide for passage of air and/or fluid conduits, electrical lines, and the like, used in the operation of the tractor-trailer (not shown). Each front hanger 23A is attached by welding or other suitable means, to the lowermost surface of a respective one of main members 21 at a location directly beneath cross members 22A, B. Each rear hanger 23B is similarly attached at a location directly beneath cross members 22D, E.

Each main member 21 has a pair of rail guides 25 mounted on its outboard surface by bolts 26. Each rail guide 25 is mounted adjacent to a respective one of the ends of main member 21. A low friction strip 27 is attached to the uppermost surface of each main member 21 by recessed fasteners 28, and extends generally the entire length of main member 21. Strip 27 is formed of any suitable low friction material, such as ultra-high molecular weight polyethylene.

As mentioned hereinabove, and as best shown in FIG. 2, slider 20 supports front and rear axle/suspension systems 30A and 30B, respectively. Inasmuch as each axle/suspension system 30A, B is suspended from slider 20, but does not form an integral part thereof, only the major components of system 30 will be cited for aiding in the description of the environment in which the slider and the retractable pin mechanism 24 operates. Each axle/suspension system 30A, B includes generally identical suspension assemblies 31 suspended from each hanger of the pairs of hangers 23A, B, respectively. Each suspension assembly 31 includes a suspension beam 32 which is pivotally mounted on hanger 23 in a usual manner. An air spring 33 is suitably mounted on and extends between the upper surface of the rearwardmost end of suspension beam 32 and main member 21 at a location directly beneath a certain one of the cross members 22C, F. A shock absorber 34 extends between and is mounted on suspension beam 32 and the certain cross member 22. One or more reinforcement struts 60 are strategically attached within each cross member 22C, F to strengthen the cross member for supporting suspension assemblies 31. Other components of suspension assembly 31, mentioned herein only for the sake of relative completeness, include an air brake 35 and a height control valve 36. An axle 37 extends between and is captured in the pair of suspension beams 32 of each axle/suspension system 30A, B. Wheels 38 are mounted on each end of axle 37.

Slider 20 is movably mounted on trailer body 40 (FIGS. 3 and 4) by slidable engagement of rail guides 25 with spaced apart, parallel, and generally Z-shaped rails 41, which are mounted on and depend from the underside of the trailer body. Each low friction strip 27 abuts the bottom surface of the uppermost portion of a respective one of rails 41 to provide a smooth, generally friction-free contact surface for slidable movement of slider 20 under trailer body 40.

Figure 3:
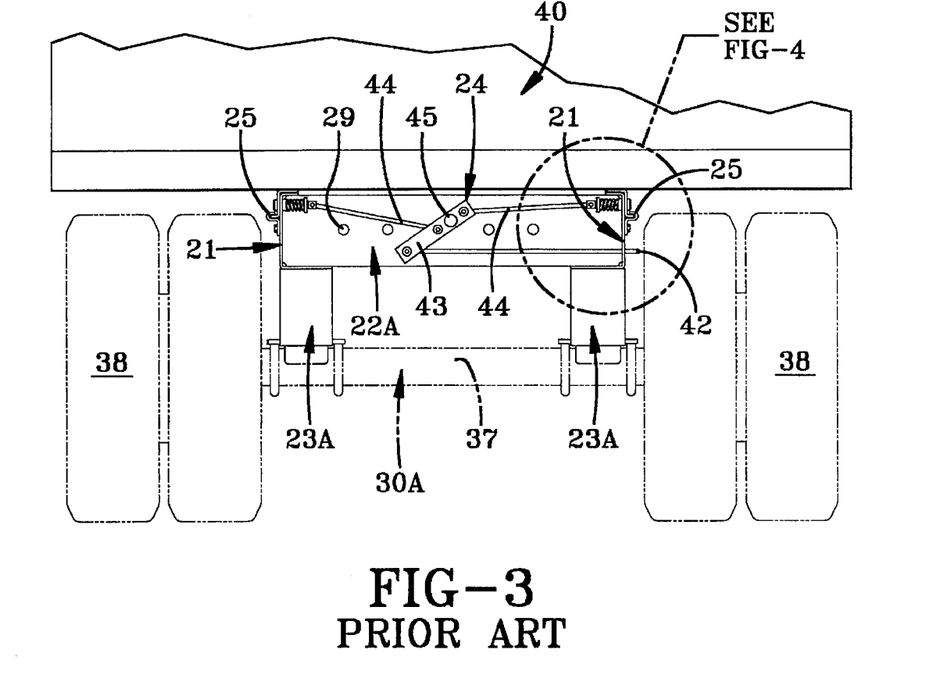
FIG. 3 is a reduced fragmentary view looking in the direction of lines 3—3 of FIG. 2, and showing the slider of FIG. 2 movably mounted on the underside of a trailer body.
Figure 4:
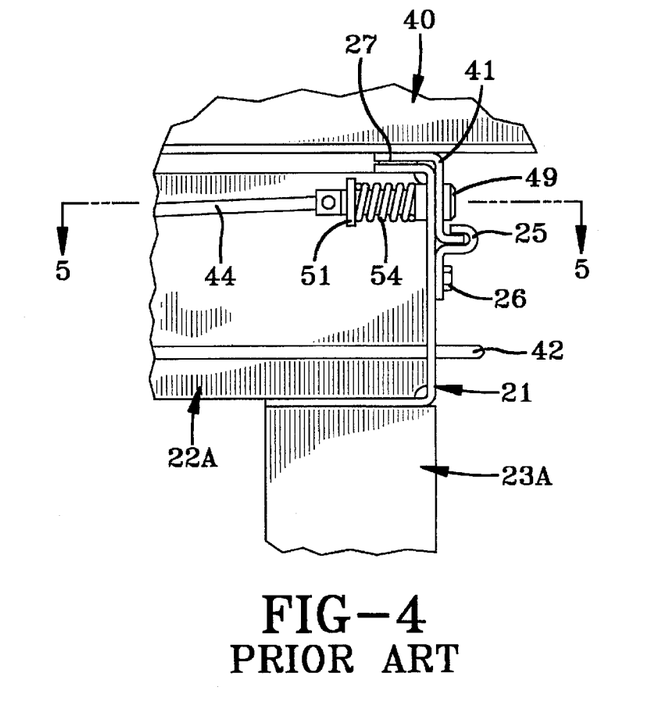
FIG. 4 is an enlarged fragmentary view taken from the area circled by broken lines in FIG. 3, showing one of the prior art pins of the retractable pin mechanism in the locked position.

Slider 20 can be selectively positioned relative to trailer body 40 for optimum load distribution by retractable pin mechanism 24. As best shown in FIGS. 1,3 and 4, pin mechanism 24 includes a generally L-shaped handle 42, which passes through an opening 39 formed in a selected one of main members 21. It can be seen that the bent end portion of handle 42 which extends outwardly from the outboard side of main member 21, is accessible for easy grasping by an operator of the tractor-trailer. The inboard end of handle 42 is pivotally attached to a lever 43, which in turn is pivotally attached to a pair of arms 44 which extend in opposite outboard directions from lever 43. Lever 43 further is attached to an elongated pivot rod 45 which passes rearwardly through a plurality of aligned openings 46 formed in cross members 22. The end of pivot rod 45 remote from lever 43 is similarly attached to a remote lever 47, which in turn is pivotally attached to a pair of arms 48 which extend in opposite outboard directions from lever 47. The outboard end of each of arms 44, 48 is bent and is pivotally attached to the inboard end of a prior art locking pin 49.

The inboard end of each prior art locking pin 49 is slidably mounted (FIG. 5) in an opening 50 formed in a bracket 51 which is attached by suitable means such as welding to a respective one of cross members 22A and 22F. The enlarged cylindrical outboard end of each pin 49 passes through an opening 52 formed in a respective one of main members 21. When it is desired to lock slider 20 in a selected position relative to trailer body 40, main member openings 52 are aligned with selected ones of a plurality of correspondingly sized openings 53 formed in rails 41 of the trailer body. Each pin 49 automatically extends through the selected aligned openings 52,53 since the pin is biased in an outboard direction by a coil spring 54 captured between bracket 51 and the enlarged outboard end of pin 49. When it is again desired by the operator of the tractor-trailer to move slider 20 beneath trailer body 40, the parking brake of the trailer is engaged, handle 42 is pulled in an outboard direction to retract pins 49 out of rail openings 53 and against the bias of spring 54, and slider 20 is moved longitudinally along rails 41 until main member openings 52 align with selected rail openings 53 and prior art locking pins 49 engage therewith as described hereinabove for maximizing load distribution.

Figure 7:
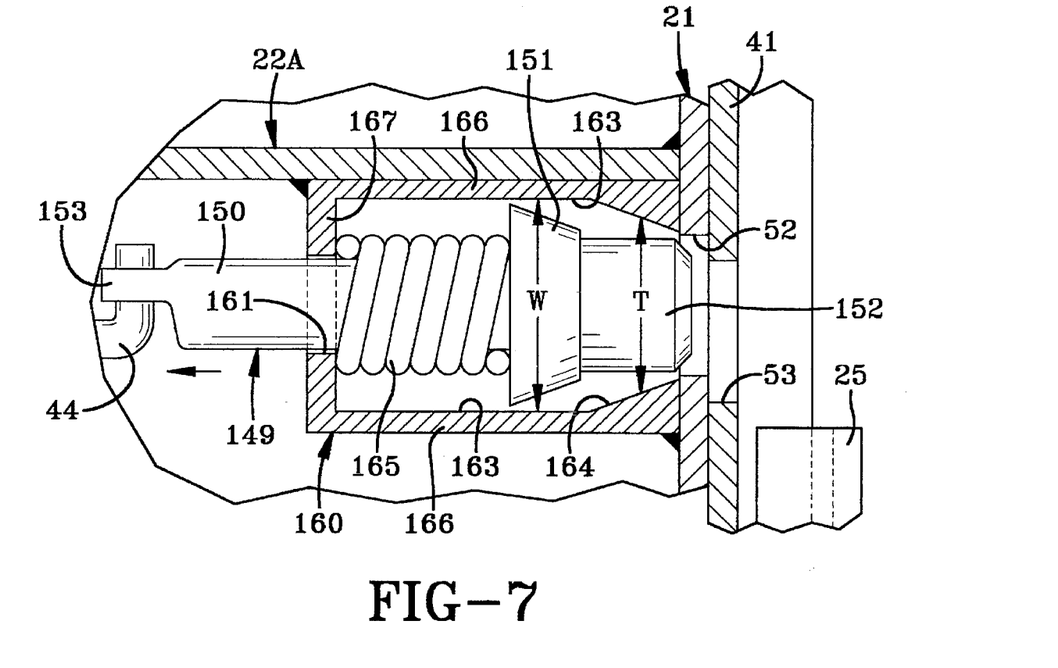
FIG. 7 is an enlarged fragmentary sectional view of a locking pin of the present invention, with hidden parts represented by broken lines, and showing the pin in the fully retracted unlocked position.
Figure 8:
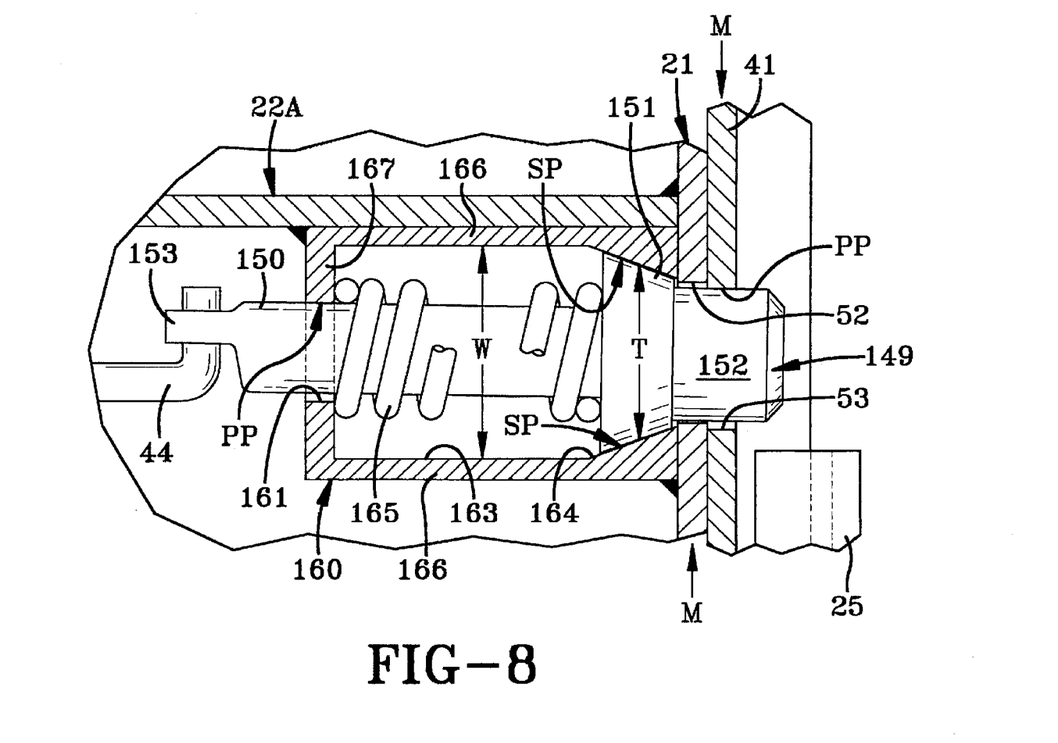
FIG. 8 is a view similar to FIG. 7, but showing the pin of the present invention in a fully extended locked and jammed position.
Figure 9:
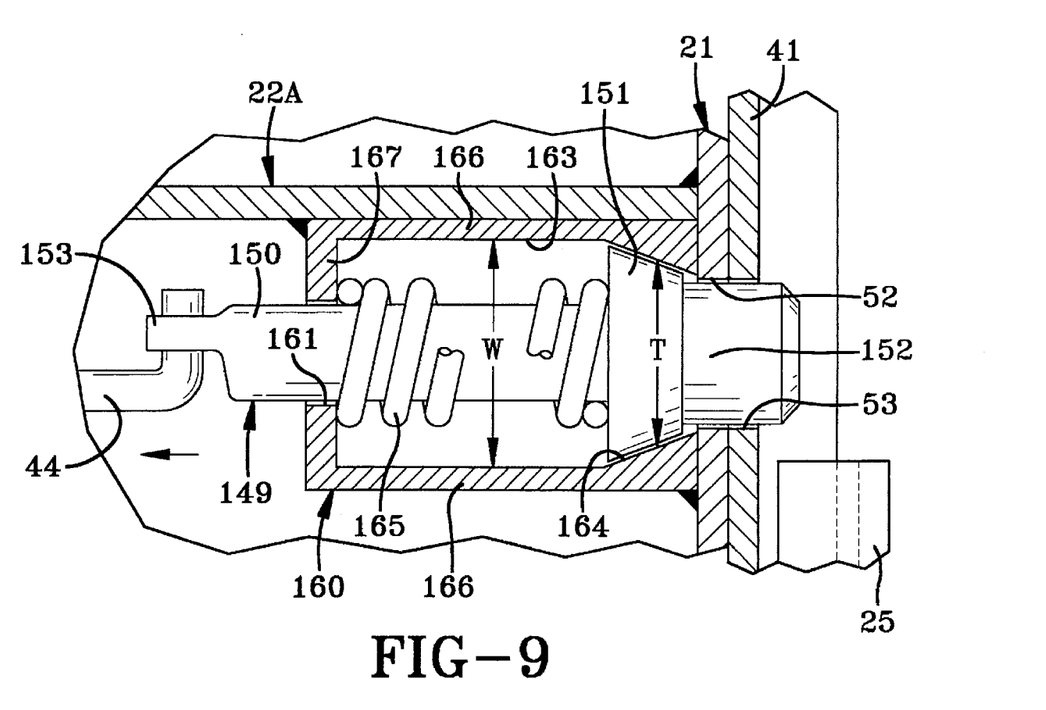
FIG. 9 is a view similar to FIG. 8, but showing the pin of the present invention in a slightly retracted unjammed position.

The improved locking pin of the present invention for a retractable pin mechanism of a tractor-trailer slider is indicated generally at 149 and is shown in FIGS. 7 through 9. The environment in which locking pin 149 of the present invention operates is generally identical to that described above for prior art locking pin 49, including slider 20 and retractable pin mechanism 24, with the differences in structure and operation between the improved locking pin of the present invention and prior art locking pins being particularly described hereinbelow.

Pin 149 is formed of any sturdy material, preferably steel, and includes an elongated generally cylindrical-shaped base 150. In accordance with one of the main features of the present invention, the outboard end of pin base 150 is integrally formed with an increased diameter tapered or truncated conical-shaped portion 151. The inboard end of truncated conical portion 151 has a larger diameter than its outboard end. Truncated conical portion 151 is in turn integrally formed with a generally cylindrical-shaped outboard end portion 152. Outboard end portion 152 has a diameter larger than base 150, and slightly smaller than the outboard end of truncated conical portion 151. Moreover, the diameter of outboard end portion 152 is generally the same as that of the enlarged cylindrical outboard end of prior art pins 49 (see FIG. 5). Thus, locking pin 149 of the present invention can be retrofitted on sliders having prior art locking pins 49 (or be installed on new sliders), since outboard end portion 152 is the only part of pin 149 which engages slightly larger-sized aligned openings 52,53 formed in slider main members 21 and tractor-trailer rails 41, respectively. The inboard end of base 150 is integrally formed with a stud 153. An opening (not shown) is formed in stud 153 for pivotally receiving the bent end of a respective one of arms 44,48 of retractable pin mechanism 24, thereby connecting locking pins 149 to the remainder of the mechanism.

Pin 149 is partially contained in a generally rectangular-shaped enclosure 160 which is formed of any durable material, preferably steel. Each enclosure 160 is attached to a respective one of cross members 22A,F and a respective one of main members 21 of slider 20 by any suitable means such as welding. Enclosure 160 includes a pair of side walls 166 and an inboard wall 167. An opening 161 is formed in inboard wall 167 of enclosure 160, and has a diameter slightly larger than that of pin base 150 which passes through the opening.

In accordance with another of the main features of the present invention, the interior of enclosure 160 includes an inboard section 163 having a width W which is slightly larger than the largest diameter of truncated conical portion 151 of pin 149, and extends the majority of the length of enclosure 160 to allow for travel of the pin within the enclosure as will be set forth in detail below in the description of the operation of pin 149. The outboard section 164 of enclosure 160 has a tapering width T which tapers from the width of inboard section 163 to the width of slider main member opening 52, and generally corresponds to the tapering diameter of truncated conical portion 151 of pin 149. Outboard section 164 entirely surrounds pin 149 (not shown) to allow for full and stable nesting of tapered portion 151 therein as will be described below. However, enclosure 160 is otherwise open so that pin 149 is accessible for maintenance and the like and to prevent the enclosure from collecting debris. A coiled spring 165 is disposed about base 150 of pin 149 and is captured between inboard wall 167 of enclosure 160 and truncated conical portion 151 of pin 149. Spring 165 biases pin 149 in an outboard, extended or locked position, as will be described in detail below.

Figure 5:
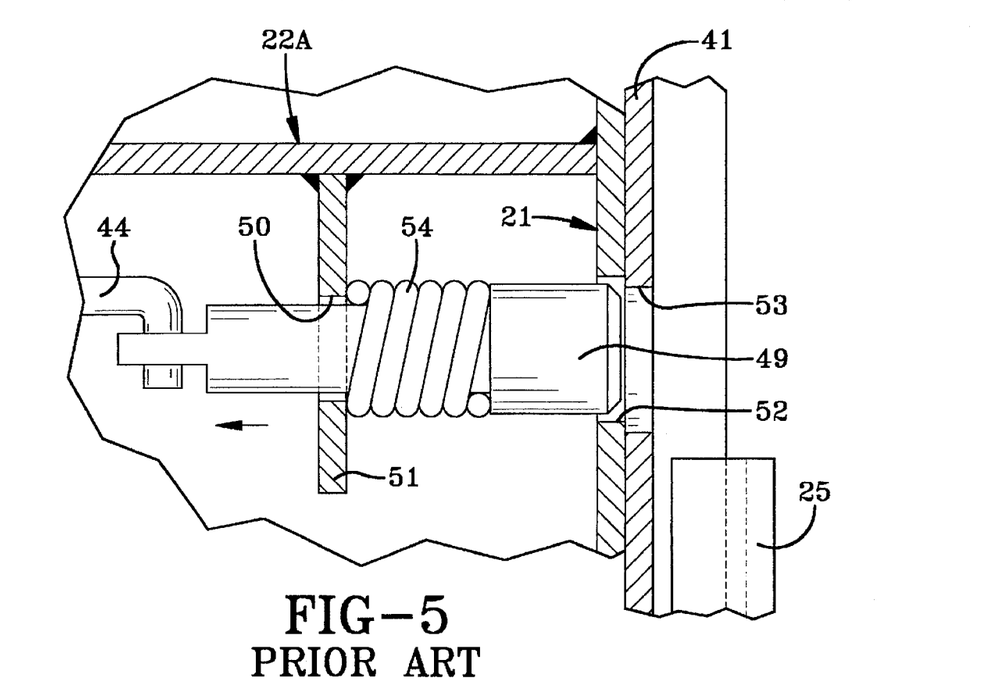
FIG. 5 is an enlarged sectional view taken along lines 5—5 of FIG. 4, and showing the prior art pin in the fully retracted unlocked position.
Figure 6:
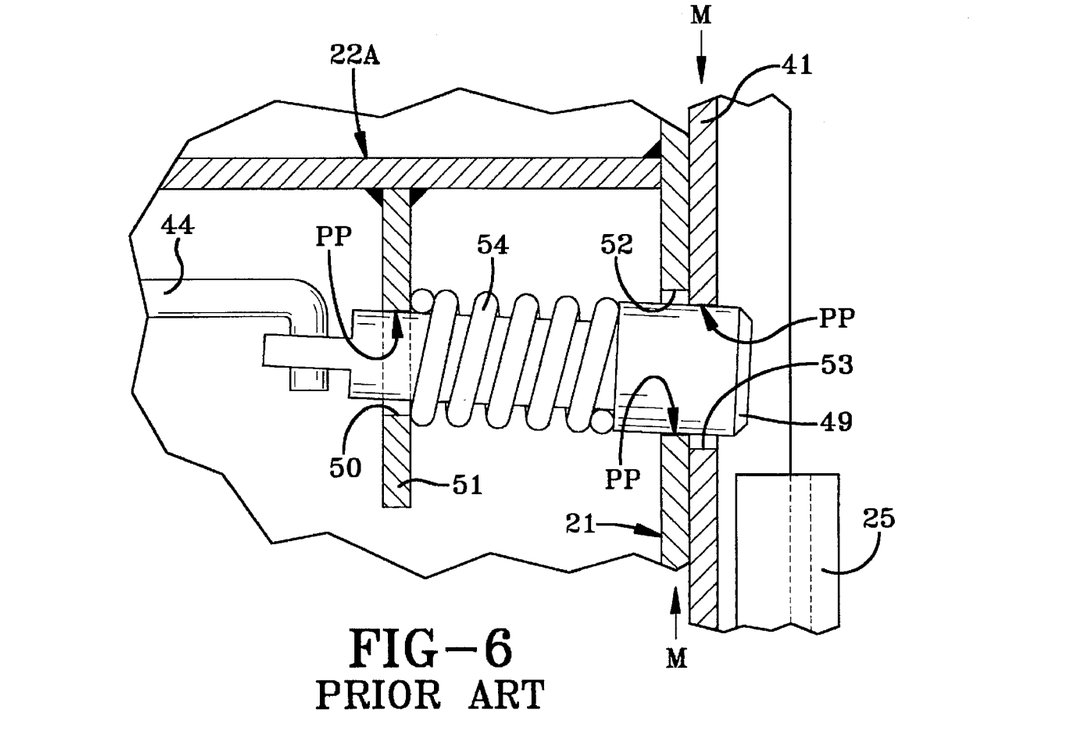
FIG. 6 is a view similar to FIG. 5, but showing the prior art pin in a fully extended locked and jammed position.

As is best shown in FIGS. 4 and 5 and especially FIG. 6, it can be appreciated that prior art locking pins 49 can become jammed during routine operation of retractable pin mechanism 24. More particularly, shear forces are caused to operate on pins 49 when they are in the extended or locked position, because of slight movement of slider 20 and its main members 21 relative to trailer body 40 and its rails 41, causing misalignment as indicated by arrows M in FIG. 6. Specifically, this movement results in slight misalignment between slider openings 52 and trailer body openings 53. The misalignment in turn causes contact pressure points between each pin 49 and its respective trailer body rail opening 53, slider main member opening 52, and bracket opening 50, as represented by arrows PP. The contact point pressure in turn causes the shear forces which operate in the direction of the longitudinal axis of each cylindrical pin to resist retraction of the pins to the unlocked position.

The mechanical advantage enjoyed by the manual operator of the retractable pin mechanism 24 must be greater than the whipsaw-like forces acting on jammed pins 49 in order to overcome the resultant shear forces to retract or free the pins to the unlocked position shown in FIG. 5. However, the mechanical advantage is often inadequate and so the operator must personally exert additional physical force to free the jammed pins. This type of overexertion by the operator can cause personal injury and/or damage to retractable pin mechanism 24. Specifically, a typical method of attempting to release prior art jammed pins is for the operator to rock trailer body 40 fore and aft, while an assistant operates the retractable pin mechanism. The rocking motion briefly realigns misaligned openings 52, 53 so that the assistant can retract the pins during the period of realignment. Also, add-on devices designed to release jammed pins, such as a prior art quick-release device which allows the operator to maneuver the trailer while the quick-release device automatically frees the jammed pins, eliminates the need for another person to operate the retractable pin mechanism. While the quick-release device does make freeing jammed pins a one-person job, it still requires the operator to rock the trailer which is time consuming and can cause damage to the retractable pin mechanism.

The improved locking pin 149 of retractable pin mechanism 24 for tractor-trailer sliders of the present invention, remedies the problem of requiring excessive force and/or additional equipment to free jammed pins by enabling the pins to free themselves. As best shown in FIG. 8, when pin 149 is in the fully extended or locked position, shear forces can operate on the pin due to slight movement of slider main members 21 relative to trailer body rails 41. Specifically, and similar to the problem described hereinabove for prior art locking pins, this movement in turn causes misalignment between slider openings 52 and trailer body openings 53 as indicated by arrows M. However, due to the spring-biased snug nesting of tapered portion 151 of locking pin 149 in tapered outboard section 164 of enclosure 160, together with the relatively snug fit of the inboard portion of pin base 150 in enclosure opening 161, the longitudinal axis of pin 149 in maintained generally perpendicular to slider main member 21 and trailer body rail 41. Yet, even with such improvements, pin 149 can become jammed as shown in FIG. 8. However, rather than the contact point pressure which operates on prior art pin designs as a result of misalignment at slider main member opening 52 as shown in FIG. 6, a contact surface pressure, represented by arrow SP in FIG. 8, occurs throughout the large surface of contact between truncated conical portion 151 of pin 149 and corresponding outboard tapered section 164 of pin enclosure 160. Although contact pressure points similar to those seen in prior art pin designs still occur at enclosure opening 161 and trailer rail opening 53 as indicated by arrows PP in FIG. 8, and in turn cause shear forces to operate in the direction of the longitudinal axis of the pin, the jamming or whipsaw-like effect caused by the shear forces is reduced. Specifically, due to the large surface contact between truncated conical portion 151 of pin 149 and outboard tapered section 164 of enclosure 160, clearance is easily created between the surfaces when the vehicle operator attempts to free the jammed pins. This clearance is created with very little retraction motion on the part of retractable pin mechanism 24 and the vehicle operator, and is similar to removing a tapered cup from within another identical tapered cup. Once clearance occurs, the contact pressure points at enclosure opening 161 and trailer body rail 53 also are relieved, enabling the pin mechanism to be fully retracted for repositioning of the slider, as shown in FIGS. 9 and 7, respectively.

It is understood that the locking pins of the present invention also could be utilized on sliders having spring suspension systems, without affecting the concept or operation of the invention.

Thus, again, the improved locking pin of the retractable pin mechanism for tractor-trailer sliders of the present invention, enables locked jammed pins to be quickly and easily freed by a single operator with limited physical force and exertion, and without substantial additional equipment and cost or damage to the retractable pin mechanism.

Accordingly, the improved locking pin for retractable pin mechanisms of tractor-trailer sliders is simplified, provides an effective, safe, inexpensive, and efficient article which achieves all the enumerated objectives, provides for eliminating difficulties encountered with prior locking pins of tractor-trailer slider retractable pin mechanisms, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries, and principles of the invention, the manner in which the improved locking pin for tractor-trailer slider retractable pin mechanisms is constructed, arranged and used, the characteristics of the construction and arrangement, and the advantageous, new and useful results obtained; the new and useful structures, devices, elements, arrangements, parts, and combinations are set forth in the appended claims.

What is claimed is:

1. A retractable locking pin mechanism of a subframe structure for a vehicle trailer, said subframe structure being movably mounted on spaced-apart, parallel elongated rails mounted on the bottom of said trailer, said trailer rails each being formed with a plurality of openings, said subframe structure including a pair of spaced-apart, parallel elongated main members, said main members each including means for movably engaging a respective one of said trailer rails, said main members each further being formed with at least one locking pin opening, said main member opening being selectively alignable with its respective trailer rail openings, for passage of a generally complementary-sized and shaped locking pin through the respective aligned openings for locking the subframe structure in a selected position relative to the vehicle trailer, said retractable locking pin mechanism including means for extending said pins to a locked position and a retraction mechanism for retracting the pins to an unlocked position, wherein the improvement comprises a locking pin including:

a) a generally cylindrical-shaped first end for extending through its respective aligned main member and trailer rail openings when the pin is in the extended locked position, for selectively positioning the subframe structure relative to the vehicle trailer;

b) a second end attached to said retraction mechanism;

c) a tapered midsection disposed between said first and second ends; and d) a receptacle mounted on said subframe structure, said receptacle formed with a tapered opening which is aligned with said respective main member opening, so that upon movement of said pin to an extended locked position, said tapered midsection nests firmly in said tapered receptacle opening, whereby said locking pin is generally easily retracted by said retraction mechanism when said pin becomes jammed due to misalignment of said subframe main member and trailer rail openings.

2. The improved locking pin of claim 1, in which the width of said tapered midsection decreases from adjacent said second end to adjacent said first end of said locking pin.

3. The improved locking pin of claim 2, in which said tapered midsection is generally truncated conical-shaped.

4. The improved locking pin of claim 3, in which said locking pin second end is generally cylindrical shaped; and further in which the second end extends through a generally complementary-sized opening formed in said receptacle means for stabilizing said second end.

5. The improved locking pin of claim 4, in which said locking pin tapered midsection is integrally formed with said locking pin first and second ends.

6. The improved locking pin of claim 5, in which the receptacle means is a generally rectangular-shaped enclosure having spaced-apart, parallel elongated sides and an end extending between and formed integrally with an inboard end of said sides adjacent to the locking pin second end; in which said generally complementary-sized receptacle means opening is formed in said enclosure end and is slightly larger in diameter than said locking pin second end; in which said tapered opening is formed on an interior surface of the outboard end of said enclosure sides opposite from said inboard end; and further in which the width of said tapered opening decreases in the direction from the inboard end to the outboard end of said sides; and in which said enclosure includes spaced apart top and bottom members which extend between and are formed integrally with said enclosure sides about the tapered enclosure opening.

7. The improved locking pin of claim 6, in which the means for extending said pin to a locked position is a coil spring disposed about the locking pin second end, said coil spring being captured between the locking pin midsection and the end of the enclosure; and in which said coil spring biases said pin to the extended locked position and said retraction mechanism must overcome said bias to retract the pin to an unlocked position.

8. The improved locking pin of claim 6, in which said locking pin second end is pivotally attached to said retraction mechanism.

* * * * *